Jan. 16, 1945. J. BOLSEY 2,367,195
PHOTOGRAPHIC CAMERAS
Filed March 6, 1942 2 Sheets-Sheet 1
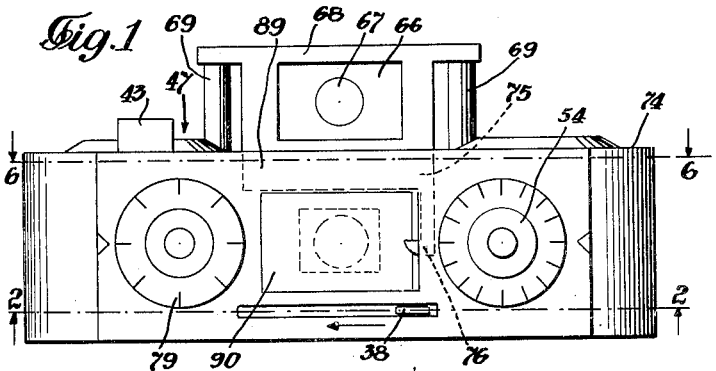
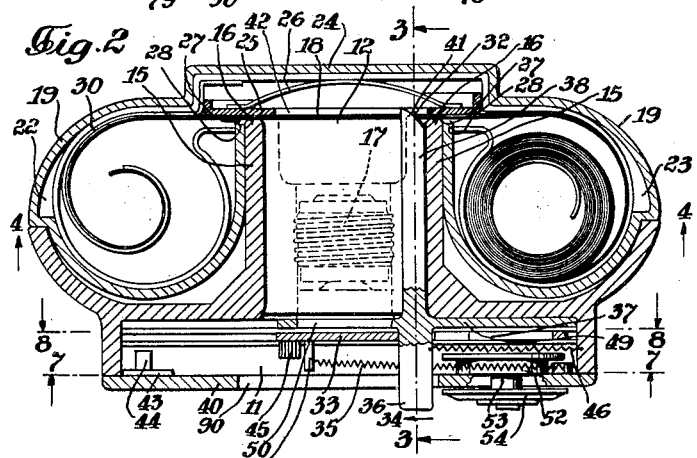
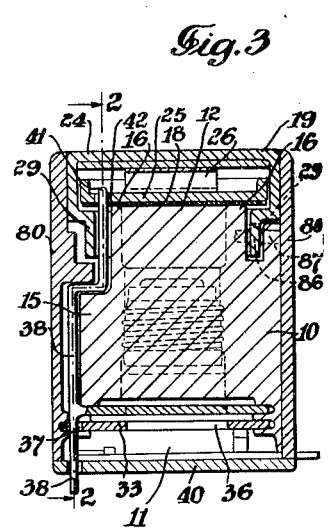
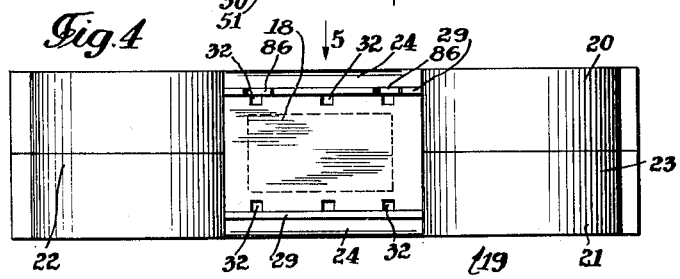
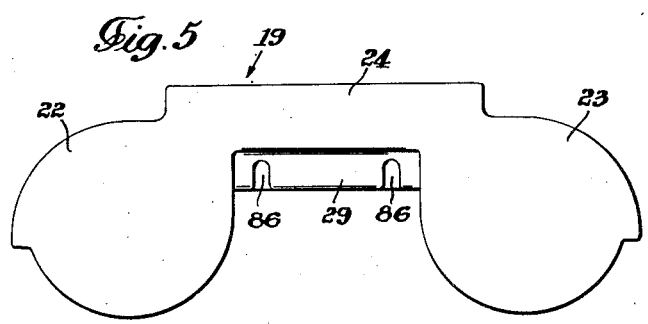
INVENTOR:
Jacques Bolsey

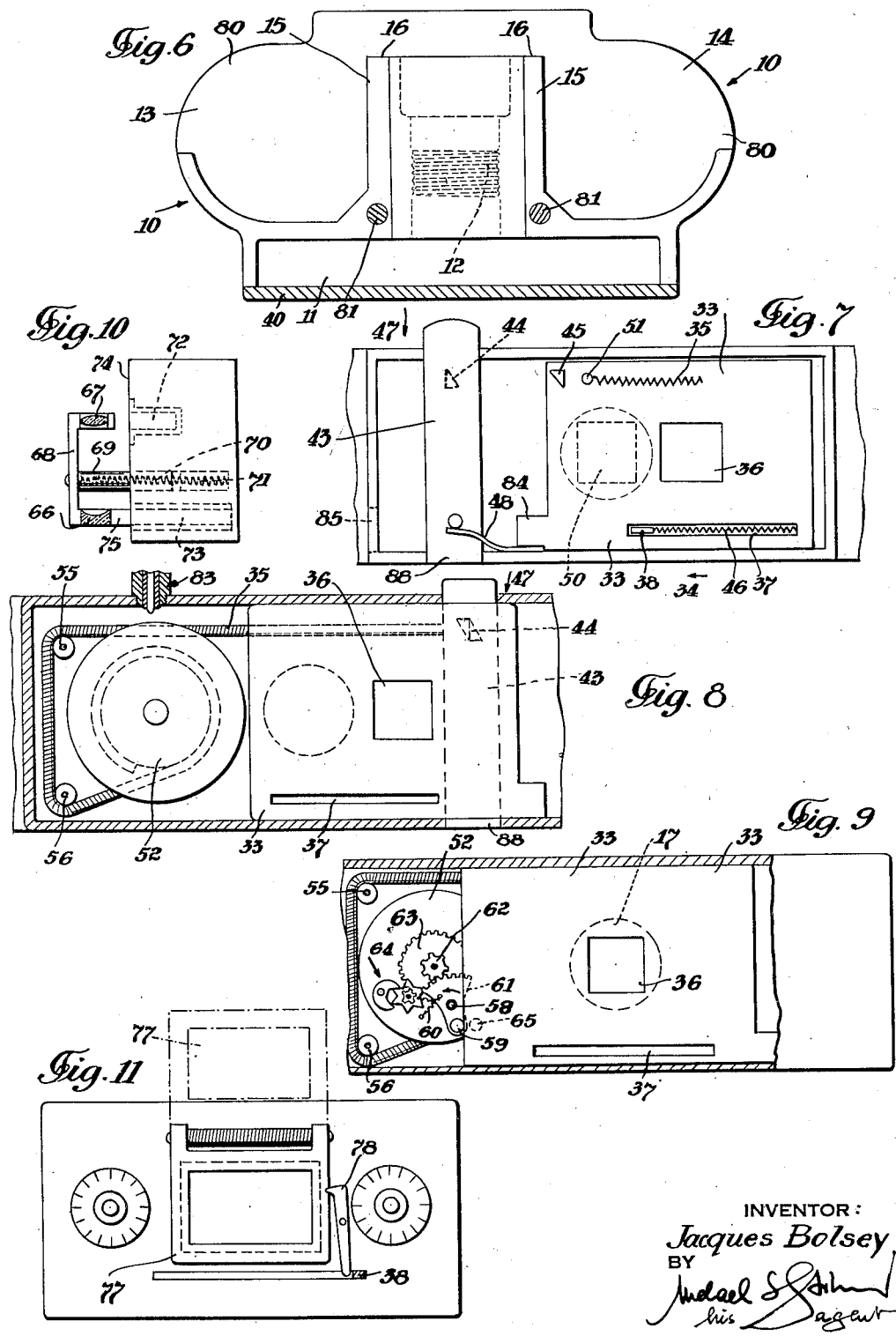

Patented Jan. 16, 1945

2,367,195

UNITED STATES PATENT OFFICE 2,367,195

PHOTOGRAPHIC CAMERA

Jacques Bolsey, New York, N. Y.

Application March 6, 1942, Serial No. 433,541

14 Claims. (Cl. 95—31)

My present invention relates to photographic cameras and more particularly to photographic cameras of small size for which cinematographic film is used.

It is an object of my present invention to make such a camera of a simple design which is nevertheless equipped with means for exact and correct adjustment of all exposure factors.

A further object of my invention consists of a roll-film camera of new design in which the film is housed in a separate film magazine.

Still a further object of my invention consists of a new camera construction in which the film is transported not by a film spool as usual, but by a claw-like member engaging the film perforations.

Still a further object of my present invention consists of an entirely new design for film magazines for photographic cameras with resilient pressure plates built into the magazines.

Another object of the present invention consists of combining the film magazine with the camera body in such a manner as to use all available space within the camera body for useful purposes, thereby substantially reducing the camera size.

Still another object of the present invention consists in new hand operated means adapted to transport the film and simultaneously arm the shutter.

With the above object in view, my present invention mainly consists of a photographic camera comprising a camera body, a camera lens in the front part of this camera body, an exposure chamber within this body arranged behind the camera lens and being open at its rear end, and a plane aperture surface at the rear end of this camera body around the rear edge of the exposure chamber; this aperture surface has to be positioned in the focal plane of the camera lens, normal to the optical axis of the same.

A removable film magazine of new type is combined with this camera; this film magazine comprises two magazine compartments being spaced from each other, one for the unexposed and the other for the exposed film coil, a connecting member holding these magazine compartments spaced from each other, and a resilient pressure member; this pressure member has to be arranged in the space between above magazine compartments and secured to the magazine in such a manner as to press the film portion to be exposed and extending from one magazine compartment to the other against the aperture surface at the rear end of the camera body when the magazine is brought into operative, picture taking position with the magazine compartments positioned on both sides of the exposure chamber.

The novel features which I consider as characteristic for my invention are set forth in particular in the appended claims. The invention itself, however, both as to its construction and its method of operation, together with additional objects and advantages thereof, will be best understood from the following description of specific embodiments, when read in connection with the accompanying drawings in which:

Fig. 1 shows a front view of the new camera;

Fig. 2 shows a longitudinal section through the camera with inserted film magazine, along line 2—2 of Fig. 1;

Fig. 3 shows a cross section of the camera and magazine shown in Fig. 2, along line 3—3 of Fig. 2;

Fig. 4 is a front view of the film magazine, seen in direction of arrows 4 on Fig. 2;

Fig. 5 is a side view of the film magazine shown in Fig. 4, seen in direction of arrow 5;

Fig. 6 is a cross section of the camera body along line 6—6 of Fig. 1;

Fig. 7 is a front view of the shutter compartment of the camera without the front plate of this compartment, along line 7—7 of Fig. 2;

Fig. 8 is a cross section through the shutter compartment along line 8—8 of Fig. 2;

Fig. 9 is a front view of the means for time exposure arranged in the shutter compartment of the camera;

Fig. 10 is a schematic view of a view finder arrangement used in combination with the new camera; and Fig. 11 is a modification of the view finder arrangement shown in Fig. 10.

An important part of my new camera is the camera body 10 shown in Figs. 2, 3, and 6. This camera body 10 comprises a frontal compartment 11 for the shutter mechanism, a central exposure chamber 12 open at its rear end, and two compartments 13 and 14 for the corresponding parts of the film magazine. The central portion 15 of camera body 10 is provided at its rear end with an aperture surface being arranged around the rear edge of the exposure chamber 12. This aperture surface 16 is located in the focal plane of the camera lens 17 normal to the optical axis thereof. It is evident that in order to attain sharpness of the taken picture the film 18 must be, during exposure, in close contact with this aperture surface 16. The side walls 80 of the camera body 10 which are secured to the central body portion 15 by screws 81 extend, as shown in Fig. 6, farther back than the aperture surface 16 of this central body portion in order to correspond in shape with the film magazine shown in Figs. 4 and 5 and to prevent light from reaching the film while it is in contact with and pressed against the aperture surface 16.

The film magazine 19, as shown in Figs. 4 and 5, consists of two magazine members 20 and 21 which—when put together—form two film coil containers 22 and 23. These film coil containers 22 and 23 are connected by a channel or U-shaped bridge-like member 24 arranged substantially in a plane tangential to the cylindrical surface of the film containers 22 and 23, as shown in Fig. 6. Within this channel shaped connecting member 24 a resilient pressure member is arranged; this pressure member consists of pressure plate 25 and leaf spring 26. Pressure plate 25 might be secured to spring 26, if required; the latter is secured to the inner bottom surface of the channel shaped member 24, thus holding pressure plate 25 at a certain distance from member 24 and enabling movement of this plate normal to the plane of member 24. As shown in Fig. 2, each of the cylindrical film coil containers 22 and 23 is provided with a slit shaped opening 27 for the film 18 passing from one container along pressure plate 25 into the other container. The pressure plate 25 is arranged in such a manner as to press against the projecting portions 28 of the film coil containers 22 and 23 and thus to close the slit shaped opening 27 when no film passes between these containers. This results in light tight enclosure of the entire film when the film is coiled up in one container only.

It should also be mentioned that the slit shaped openings 27, connecting member 24 and pressure plate 25 are arranged in such a manner that light can never penetrate into the film coil containers 22 and 23; also if the film 18 passes through the slit shaped openings 27, the pressure plate 25 presses against this film in such a manner as to make entry of light into the containers impossible. This latter fact is especially important when a new film magazine has to be inserted into the camera in daylight.

The manner in which the film magazine 19 is inserted into the camera is shown in Fig. 2: as may be seen in this figure, during operation of the camera the two film coil containers 22 and 23 are in the corresponding compartments 13 and 14 of the camera body 10; in this position pressure plate 25 presses film 18 against the aperture surface 16 of the central portion 15 of camera body 10, thus holding the film portion to be exposed at the required distance, namely, in the focal plane of the camera lens 17.

As shown in Figs. 3 to 5, the channel shaped connecting member 24 is also provided with small plates 29 fitting into corresponding slits of the central camera body 15; these small plates 29 serve as light traps, preventing light from reaching the film portion to be exposed between the film coil containers 22 and 23. In order to ensure proper inserting of the magazine into the camera body one of the plates 29 may be provided with cut outs 86, cooperating with corresponding pins 87; this arrangement prevents incorrect insertion of the magazine into the camera.

As shown in the drawings, no film spools or other means for winding up the film in the containers 22 and 23 are provided: the film transport is carried out by direct transport of the film portion sliding along pressure plate 25, with the aid of means described below in detail. However, I have found that it is hardly possible to form a film coil within a cylindrical container by simply pushing a film through a slit in this container and sliding its end along the inner container wall: after formation of a few coil windings which are naturally lying in contact with the inner container wall and pressing against it, friction between these windings themselves and between the outermost winding and the container wall will block further coiling up of the film. Therefore, I herewith proposed to provide in the film coil container 22 into which the film 18 is wound up a helical spring 30 serving as guiding means for the film during its coiling up.

It should be noted that it is possible to provide also in the film coil container 23 a helical spring 30; this spring then serves for facilitating loading of the film container by pushing an unexposed film strip into the same through the slit shaped opening 27.

A further novel feature of the new camera proposed herewith consists of new hand-operated means for transporting the film 18 by engagement of the perforations 32 and for simultaneously arming the plane shutter 33 arranged in the frontal compartment 11 of the camera body 10. This shutter 33 is arranged in such a manner that the shutter moving spring 35 is armed by sliding shutter 33 in direction of arrow 34; during exposure shutter 33 is then forced by spring 35 to move opposite to the direction of arrow 34. The shutter 33 is provided as shown in Figs. 8 and 9 with an aperture opening 36 and a longitudinal slit 37. Through this slit 37 passes a longitudinal operating member 38, serving simultaneously as film transporting and shutter arming device. This longitudinal member 38 extends from the front wall 40 of the shutter compartment slightly beyond the plane of the aperture surface 16 of the camera body 10. At its rear end, i. e., at its end extending beyond the aperture surface 16, the longitudinal operating member 38 is provided with a claw shaped tip 41 penetrating in the perforations 32 of the film 18. In order to avoid direct pressure of the claw shaped tip 41 against pressure plate 25, this plate is provided with a slit 42, extending in longitudinal direction under the path of this tip 41. However, it is for instance also possible to shape tip 41 in such a manner that it extends beyond the aperture surface 16 only a distance which is shorter than the thickness of film 18, thereby avoiding direct contact between pressure plate 25 and tip 41 when a film is inserted in the magazine. A modification consists in making tip 41 of operating member 38 resilient along its edge, thereby enabling the operating member 38 to slide along the film 18 without engaging and transporting the same when moved in direction opposite to arrow 34.

It is evident that when the operating member is moved in direction of arrow 34, it simultaneously transports the film 18 and moves the shutter 33, thereby arming the shutter spring 35. It is advantageous to provide means indicating that shutter 33 is in armed position; for this purpose the shutter may be provided with a projection 84 projecting through slot 85 when shutter spring 35 is armed. It is also possible to provide a sign, e. g., a colored spot, on that portion of the front face of shutter 33 which is behind aperture 90 in front wall 40 when shutter spring 35 is armed.

For keeping the shutter spring in armed position and releasing the shutter when required, the releasing member 43 is provided with a projection 44, engaging a corresponding projection 45 on shutter 33 when the same is moved in direction of arrow 34, arming the shutter spring 35. After engagement the shutter is held in armed position and the longitudinal film transporting and shutter arming member 38 moved back into its initial position shown in Fig. 2 by means of spring 46. During this movement, as stated above, film claw 41 does not engage film 18 so that the film stays in wound up position ready for picture taking. Pushing of the releasing member 43 downward in direction of arrow 47 against action of spring 48 results in disengagement of the projections 44 and 45, releasing shutter 33 to move by action of spring 35 against direction of arrow 34, thereby exposing the unexposed film portion between the film containers 22 and 23. It should be noted that releasing member 43 is shaped in such a way that its bottom end 88 projects through a slit of the camera wall when pushed down; this fact is in most cases adapted to prevent unintended movement of the releasing member and thus avoid unrequired exposure. Thus, for making an exposure, only the following operations are necessary:

1. Pushing the front end of operating member 38 in direction of arrow 34, thereby simultaneously arming the shutter spring 35 and transporting film 18; this member 38 is then moved back automatically into its initial position by spring 46; and 2. Pushing down of the releasing member 43 in direction of arrow 47, thereby releasing shutter 33 to move opposite to direction of arrow 34 and expose the film 18.

It should be noted that means have to be provided for preventing light to enter the exposure chamber during movement of shutter 33 in direction of arrow 34, i. e., during arming of the shutter spring 35. These means consist of a second additional shutter 49, rigidly connected to or forming part of the operating member 38. This shutter 49 is provided with an additional exposure opening 50, arranged in such a manner as to be in front of exposure chamber 17 when member 38 is in picture taking initial position shown in Fig. 2. This additional shutter 49 has the following effect: during movement in direction of arrow 34, i. e., during arming of the shutter spring 35, shutter 49 is moved by member 38 in direction of arrow 34. Member 38 simultaneously moves also shutter 33 in the same direction. In view of the fact that the exposure openings 50 and 36 of the shutters 49 and 33 respectively are arranged in such a manner that they do not overlap during movement of member 38 and shutters 33 and 49 in direction of arrow 34, no light can enter the exposure chamber 17 during movement of the shutter in direction of arrow 34, i. e., during arming of the shutter spring 35. As after arming the shutter 33 remains in armed position shown in Fig. 8, and in this position the exposure opening 36 of this shutter is not in front of the exposure chamber 17, this shutter prevents light from entering the exposure chamber while it remains in this position and shutter 49 moves back into its initial picture taking position, shown in Fig. 2. In this initial picture taking position the aperture 50 of shutter 49 is in front of the exposure chamber 17 so that after releasing of shutter 33 aperture 36 is passing along aperture 50 in front of the exposure chamber 17, thereby enabling exposure of the film 18 through the superimposed apertures 36 and 50.

In order to regulate the exposure time, spring 35 is arranged in such a manner that its tension may be adjusted. Such adjustment of the spring tension influences the speed of shutter 33 during exposure; as the exposure time is a function of the shutter speed, it is thus possible to regulate the exposure time by adjusting the spring tension. For this purpose, spring 35 is secured at its one end by means of pin 51 to shutter 33 and at its other end to drum 52 which latter is connected by shaft 53 with adjusting knob 54. In order to increase adjustability of the tension of spring 33, this spring is made as long as possible; for this purpose, the same is guided over small rollers 55 and 56, as shown in Fig. 8. By turning adjusting knob 54, provided with the exposure indications the length of spring 35 is increased or decreased, which results in variations of the tension of this spring; these variations of the spring tension result in speed variations of shutter 33 which latter are causing variations of the exposure time as required.

In order to enable varying the exposure time, the mechanism shown in Fig. 9 may be combined with the shutter mechanism described above. This exposure varying mechanism is mounted on the spring drum 52 and consists of a gear segment 61, turnably secured by means of pivot 58 to drum 52 and provided with pin 59, the function of which will be described below in detail. A small, relatively weak, spring 60 is arranged in the way shown, tending to turn the gear segment 61 in direction of arrow. This gear segment is in mesh with gear 62 which latter is arranged coaxially with and secured to gear 63. This gear 63 is combined with a speed regulating mechanism 64 of well-known type braking the speed of gears 63 and 62. Thus, the speed of rotation of gear segment 61 is also regulated by the speed regulating mechanism 64, i. e., this gear segment is not allowed to turn above a certain speed determined and kept substantially constant by mechanism 64. Pin 59 secured to gear segment 61 cooperates with pin 65 secured to shutter 33 in such a manner that pin 65 contacts pin 59 during exposure when pin 59 is moved into the path of pin 65. This can be done by rotating the spring drum 52 together with the entire mechanism consisting of gear segment 61, gears 62, 63, and speed regulating mechanism 64 in such a manner that pin 59 is turned into the path of pin 65. By regulating the degree of turning of spring drum 52, it is possible to regulate the time of engagement between pins 59 and 65, i. e., the time until pin 65 operated by the relatively strong spring 35 pushes pin 59 out of its path, against action of spring 60. As during this time the aperture 36 of shutter 33 is compelled to remain in front of the exposure chamber 17, it is possible to regulate in this way the duration of the exposure within a wide range. After exposure, the gear segment 61 is turned back into initial position by means of spring 60.

I prefer to combine with my above described camera a view finder of the type shown in Fig. 10. This view finder consists of a frontal lens 66, a rear lens 67, both mounted on the view finder body 68. This view finder body 68 is carried by hollow shafts 69 adapted to be pushed into corresponding recesses 70 within the camera body. Within these hollow shafts spring members 71 are arranged, tending to move the view finder with the lenses into the operative position shown in Fig. 10. As shown in this figure, in dotted lines, two additional recesses 72 and 73 are provided in the camera body for the lenses 66 and 67 and their mounts, enabling to push not only shafts 69 but also lenses 66 and 67 into the camera with the view finder body 68 substantially flush with the camera wall 74. The mount of the frontal lens is provided with a plate shaped extension 89 which moves behind aperture 90 in the front wall 40, when the view finder is pushed into the camera, thereby closing this aperture. Furthermore, the mount of the frontal lens 66 is provided with an extension 75 provided with a hook 76 to engage the operating member 38 or a pin secured to shutter 49 when the view finder is pushed into the camera body and this operating member is in its initial position, shown in Fig. 2. When member 38 is pushed in direction of arrow 34 during arming of spring 35 and transport of film 18, the hook 76 is disengaged from this member 38 and shutter 49, and the view finder automatically moved by springs 71 into view finding position, as shown in Fig. 1. Thus, one single movement of the operating member 38 has three simultaneous results, namely, to arm the shutter spring, to transport the film, and to move the view finder into operative position.

Fig. 11 shows a modification of the above described view finder. In this embodiment, the frontal lens 77 of the view finder is secured tiltably to the front wall 40 of the shutter compartment in such a manner that it is in down-tilted position shown in full lines when not needed and in uptilted position shown in dotted lines when used for view finding purposes. In order to hold this view finder lens in downtilted position, a turnable hook member 78 cooperating with the operating member 38 is provided; this member 78 operates in the way described above in connection with hook 76.

A switch 83 for operating a flashlight may be arranged as shown in Fig. 8; this switch is automatically closed by the shutter 33 while moving during exposure.

An image counter 79 and an adjustable diaphragm, not shown in the drawings, are also parts of the new camera.

It will be understood that each of the elements described above, or two or more together, may also find a useful application in other types of cameras differing from the types described above.

While I have illustrated and described the invention as embodied in cameras provided with film magazines, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. A photographic camera comprising a camera body having a front wall, a camera shutter arranged in said camera body immediately behind said front wall and adapted to carry out a reciprocating to and fro movement, a camera lens arranged in the front part of said camera body, an exposure chamber arranged within said camera body behind said camera lens and being open at its rear end, a plane aperture surface at the rear end of said camera body around the edge of said exposure chamber, said aperture surface being arranged in the focal plane of said camera lens normal to the optical axis of the same, a removable film magazine cooperating with said camera body and provided with a spring operated pressure plate adapted to press in operative position the film portion to be exposed against said aperture surface, and hand operated common film transporting and shutter moving means movably secured to said camera body and reaching from the outer surface of said front part of said camera body through an opening in the wall of said front part of said camera body into said body and within the same beyond said aperture surface at the rear end of said camera body, said hand operated common film transporting and shutter moving means thus being adapted to simultaneously transport the film by engaging the film perforations if said removable film magazine is in operative position cooperating with said camera body and pressing the film against said aperture surface, and to move the shutter arranged in said camera body itself into armed operative position ready for an exposure.

2. In a photographic camera of the type claimed in claim 1 said hand operated, film transporting and shutter moving means comprising a slit in said camera front wall a longitudinal operating member reaching from the outer surface of the front wall of said camera body through said slit to the film portion pressed by said pressure plate against said aperture surface, said longitudinal operating member having at its end reaching to said film portion a claw-like rear tip and having an edge reaching from said camera front wall to said claw-like rear tip said longitudinal operating member being adapted to engage with said claw like rear tip said film and with said edge said camera shutter and to be moved to and fro at its front end projecting through said slit in the front wall of said camera body, thus enabling simultaneous transportation of the film and moving of the shutter into armed operating position ready for an exposure.

3. In a photographic camera of the type claimed in claim 1 said hand operated, film transporting and shutter moving means comprising a slit in said camera front wall a longitudinal operating member reaching from the outer surface of the front wall of said camera body through said slit to the film portion pressed by said pressure plate against said aperture surface, said longitudinal operating member having at its end reaching to said film portion a claw-like rear tip and having an edge reaching from said camera front wall to said claw-like rear tip said longitudinal operating member being adapted to engage with said claw like rear tip said film and with said edge said camera shutter and to be moved to and fro at its front end projecting through said slit in the front wall of said camera body, and guiding means in said camera body enabling parallel displacement of said longitudinal operating member parallel to the optical axis of said camera lens, this parallel displacement of said longitudinal operating member resulting in simultaneous transportation of the film and movement of the shutter into armed operating position.

4. A photographic camera comprising a camera body having a front wall, a camera shutter arranged in said camera body immediately behind said front wall and adapted to carry out a reciprocating to and fro movement, a camera lens arranged in the front part of said camera body, an exposure chamber arranged within said camera body behind said camera lens and being open at its rear end, a plane aperture surface at the rear end of said camera body around the edge of said exposure chamber, said aperture surface being arranged in the focal plane of said camera lens normal to the optical axis of the same, a removable film magazine cooperating with said camera body and provided with a spring operated pressure plate adapted to press in operative position the film portion to be exposed against said aperture surface, and hand-operated common film transporting and shutter moving means slidably secured to said camera body, said film transporting and shutter moving means comprising a slit in said camera front wall, a longitudinal operating member reaching from the outer surface of the front wall of said camera body through said slit and to the film portion pressed by said pressure plate against said aperture surface, said longitudinal operating member having at its end a claw-like rear tip shaped and arranged in such a manner as to be adapted to engage the film perforations when moved in the transportation direction of the film and not to engage said perforations when moved against the transportation direction of said film, said longitudinal operating member having furthermore an edge reaching substantially from said camera front wall to said claw-like rear tip being shaped and arranged in such a manner as to be adapted to engage said camera shutter and to be moved to and fro at its front end projecting through said slit in the front wall of said camera body, thus enabling simultaneous transportation of the film and moving of the shutter into armed operating position ready for an exposure.

5. A photographic camera, comprising a camera body having a front wall, a camera lens, a camera shutter arranged in the front part of said camera body and adapted to carry out reciprocating to and fro movements normal to the optical axis of said camera lens, an exposure chamber arranged within said camera body and being open at its rear end, a plane aperture surface at the rear end of said camera body around the edge of said exposure chamber, said aperture surface being arranged in the focal plane of said camera lens normal to the optical axis of the same, a removable film magazine cooperating with said camera body and provided with a spring operated pressure plate adapted to press in operative position the film portions to be exposed against said aperture surface, and hand-operated common film transporting and shutter moving means slidably secured to said camera body, said film transporting and shutter moving means comprising a slit in said camera front wall, a longitudinal operating member reaching from the outer surface of the front wall of said camera body through said slit and to the film portion pressed by said pressure plate against said aperture surface, said longitudinal operating member having at its end a claw-like rear tip shaped and arranged in such a manner as to be adapted to engage the film perforations when moved in the transportation direction of the film and to not engage said perforations when moved against the transportation direction of said film, said longitudinal operating member having furthermore an edge reaching substantially from said camera front wall to said claw-like rear tip being shaped and arranged in such a manner as to be adapted to engage said camera shutter and to be moved to and fro at its front end projecting through said slit in the front wall of said camera body, thus enabling simultaneous transportation of the film and moving of the shutter into armed operating position ready for an exposure.

6. A photographic camera comprising a camera body, a camera lens, a frontal shutter compartment arranged in the front part of said camera body, a camera shutter arranged in said frontal shutter compartment and adapted to slide to and fro normal to the optical axis of said camera lens, a shutter spring for sliding said camera shutter during exposure arranged also in said shutter compartment, an exposure chamber arranged in the rear part of said camera body and being open at its rear end, an aperture surface at said rear open end of said exposure chamber, said aperture surface being arranged in the focal plane of said camera lens normal to the optical axis of the same, a removable film magazine adapted to press in operative position a film strip against said aperture surface at said rear open end of said exposure chamber, a film transporting member reaching from said frontal shutter compartment in said front part of said camera body beyond said aperture surface at said rear open end of said exposure chamber in said rear part of said camera body so as to be adapted to engage said film strip being pressed by said removable film magazine against said aperture surface and to transport the same when moved in direction of sliding of said film, a shutter operating member adapted to slide said camera shutter in said frontal shutter compartment in direction of sliding of said film and to wind up said shutter spring, and hand operated common film transporting and shutter operating means arranged outside of said camera body and reaching into said frontal shutter compartment in said front part of said camera body, said film transporting and shutter operating means cooperating with said shutter operating member and said film transporting member so as to be adapted to simultaneously slide said camera shutter, wind up said shutter spring, and transport a film strip when said removable film magazine is in operative position pressing said film strip against said aperture surface.

7. A photographic camera comprising a camera body, a camera lens, a frontal shutter compartment arranged in the front part of said camera body, a camera shutter arranged in said frontal shutter compartment and adapted to slide to and fro normal to the optical axis of said camera lens, a shutter spring for sliding said camera shutter during exposure arranged also in said shutter compartment, an exposure chamber arranged in the rear part of said camera body and being open at its rear end, an aperture surface at said rear open end of said exposure chamber, said aperture surface being arranged in the focal plane of said camera lens normal to the optical axis of the same, a removable film magazine adapted to press in operative position a film strip against said aperture surface at said rear open end of said exposure chamber, a film transporting member reaching from said frontal shutter compartment in said front part of said camera body beyond said aperture surface at said rear open end of said exposure chamber in said rear part of said camera body so as to be adapted to engage said film strip being pressed by said removable film magazine against said aperture surface and to transport the same when moved in direction of sliding of said film, a shutter operating member adapted to slide said camera shutter in said frontal shutter compartment in direction of sliding of said film and to wind up said shutter spring, and hand operated common film transporting and shutter operating means arranged outside of said camera body and reaching into the same, said film transporting and shutter operating means cooperating with said shutter operating member and said film transporting member so as to be adapted to simultaneously slide said camera shutter, wind up said shutter spring, and transport a film strip when said removable film magazine is in operative position pressing said film strip against said aperture surface.

8. A photographic camera comprising a camera body, a camera lens, a frontal shutter compartment arranged in the front part of said camera body, a camera shutter arranged in said frontal shutter compartment and adapted to slide to and fro normal to the optical axis of said camera lens, a shutter spring for sliding said camera shutter during exposure arranged also in said shutter compartment, an exposure chamber arranged in the rear part of said camera body and being open at its rear end, an aperture surface at said rear open end of said exposure chamber, said aperture surface being arranged in the focal plane of said camera lens normal to the optical axis of the same, a removable film magazine adapted to press in operative position a film strip against said aperture surface at said rear open end of said exposure chamber, and hand operated common film transporting and shutter operating means arranged outside of said camera body and reaching through an opening in the wall of the same into said camera body and being constructed within said camera body in such a manner as to be adapted to simultaneously slide said camera shutter, wind up said shutter spring, and transport a film strip when said removable film magazine is in operative position pressing said film strip against said aperture surface.

9. A photographic camera comprising a camera body, a camera lens, a frontal shutter compartment arranged in the front part of said camera body, a camera shutter arranged in said frontal shutter compartment and adapted to slide to and fro normal to the optical axis of said camera lens, a shutter spring for sliding said camera shutter during exposure arranged also in said shutter compartment, an exposure chamber arranged in the rear part of said camera body and being open at its rear end, an aperture surface at said rear open end of said exposure chamber, said aperture surface being arranged in the focal plane of said camera lens normal to the optical axis of the same, a removable film magazine adapted to press in operative position a film strip against said aperture surface at said rear open end of said exposure chamber, and hand operated common film transporting and shutter operating means arranged outside of said front part of said camera body and reaching into said frontal shutter compartment and being constructed within said camera body in such a manner as to be adapted to simultaneously slide said camera shutter, wind up said shutter spring, and transport a film strip when said removable film magazine is in operative position pressing said film strip against said aperture surface.

10. A photographic camera comprising a camera body, a camera lens, a frontal shutter compartment arranged in the front part of said camera body, a camera shutter arranged in said frontal shutter compartment and adapted to slide to and fro normal to the optical axis of said camera lens, a shutter spring for sliding said camera shutter during exposure arranged also in said shutter compartment, an exposure chamber arranged in the rear part of said camera body and being open at its rear end, an aperture surface at said rear open end of said exposure chamber, said aperture surface being arranged in the focal plane of said camera lens normal to the optical axis of the same, a removable film magazine adapted to press in operative position a film strip against said aperture surface at said rear open end of said exposure chamber, hand operated common film transporting and shutter operating means arranged outside of said camera body and reaching through an opening in the wall of the same into the same and being constructed within said camera body in such a manner as to reach from said frontal shutter compartment beyond said aperture surface at said rear open end of said exposure chamber so as to be adapted to engage said film strip when the same is being pressed by said removable film magazine against said aperture surface and to transport the same by moving in direction of sliding of said film strip and also to be adapted to slide simultaneously said camera shutter in said frontal shutter compartment in direction of sliding of said film and to wind up said shutter spring, said hand operated common film transporting and shutter operating means thus being adapted to simultaneously slide said camera shutter, wind up said shutter spring, and transport a film strip when said removable film magazine is in operative position pressing said film strip against said aperture surface.

11. A photographic camera comprising a camera body, a camera lens, a frontal shutter compartment arranged in the front part of said camera body, a camera shutter arranged in said frontal shutter compartment and adapted to slide to and fro normal to the optical axis of said camera lens, a shutter spring for sliding said camera shutter during exposure arranged also in said shutter compartment, an exposure chamber arranged in the rear part of said camera body and being open at its rear end, an aperture surface at said rear open end of said exposure chamber, said aperture surface being arranged in the focal plane of said camera lens normal to the optical axis of the same, a removable film magazine adapted to press in operative position a film strip against said aperture surface at said rear open end of said exposure chamber, a view finder being movable between operative position arranged projecting from one face of said camera body and inoperative position arranged substantially flush with said face of said camera body, a film transporting member reaching from said frontal shutter compartment in said front part of said camera body beyond said aperture surface at said rear open end of said exposure chamber in said rear part of said camera body so as to be adapted to engage said film strip being pressed by said removable film magazine against said aperture surface and to transport the same when moved in direction of sliding of said film, a shutter operating member adapted to slide said camera shutter in said frontal shutter compartment in direction of sliding of said film and to wind up said shutter spring, a view finder operating member adapted to move said view finder from inoperative into operative position, and hand operated common shutter and view finder operating and film transporting means arranged partly outside of said camera body and reaching into the same, said common operating means cooperating with said shutter operating, said view finder operating and said film transporting members so as to be adapted to simultaneously slide said camera shutter, wind up said shutter spring, move said view finder from inoperative into operative position, and transport a film strip when said removable film magazine is in operative position pressing said film strip against said aperture surface.

12. A photographic camera comprising a camera body, a camera lens, a frontal shutter compartment arranged in the front part of said camera body, a camera shutter arranged in said frontal shutter compartment and adapted to slide to and fro normal to the optical axis of said camera lens, a shutter spring for sliding said camera shutter during exposure arranged also in said shutter compartment, an exposure chamber arranged in the rear part of said camera body and being open at its rear end, an aperture surface at said rear open end of said exposure chamber, said aperture surface being arranged in the focal plane of said camera lens normal to the optical axis of the same, a removable film magazine adapted to press in operative position a film strip against said aperture surface at said rear open end of said exposure chamber, a view finder being movable between operative position arranged projecting from one face of said camera body and inoperative position arranged substantially flush with said face of said camera body, a spring means adapted to move said view finder from inoperative into operative position, blocking means adapted to hold said view finder against action of said spring means in inoperative position, a film transporting member reaching from said frontal shutter compartment in said front part of said camera body beyond said aperture surface at said rear open end of said exposure chamber in said rear part of said camera body so as to be adapted to engage said film strip being pressed by said removable film magazine against said aperture surface and to transport the same when moved in direction of sliding of said film, a shutter operating member adapted to slide said camera shutter in said frontal shutter compartment in direction of sliding of said film and to wind up said shutter spring, a view finder operating member adapted to release said blocking means and thus enable said spring means to move said view finder from inoperative into operative position, and hand operated common shutter and view finder operating and film transporting means arranged partly outside of said camera body and reaching into the same, said common operating means cooperating with said shutter operating, said view finder operating and said film transporting members so as to be adapted to simultaneously slide said camera shutter, wind up said shutter spring, move said view finder from inoperative into operative position, and transport a film strip when said removable film magazine is in operative position pressing said film strip against said aperture surface.

13. A photographic camera comprising a camera body, a frontal shutter compartment arranged in the front part of said camera body, a camera shutter arranged in said shutter compartment, an exposure chamber in the rear part of said camera body behind said frontal shutter compartment, a view finder being movable between operative position arranged projecting from one face of said camera body and inoperative position arranged substantially flush with said face of said camera body, a spring means adapted to move said view finder from inoperative into operative position, blocking means adapted to hold said view finder against action of said spring means in inoperative position, a film transporting member reaching from said frontal shutter compartment beyond the rear end of said exposure chamber so as to be adapted to engage the perforations of a film strip if the same is arranged behind said exposure chamber, said film transporting member being movable in such a manner as to transport the film strip by engaging the perforations of the same and thus slide said film strip normal to the optical axis of said camera, a shutter operating member adapted to slide said camera shutter arranged in said frontal shutter compartment in direction of sliding of said film strip, a view finder operating member adapted to move said view finder from inoperative into operative position, and hand operated common shutter and view finder operating and film transporting means arranged outside of the front part of said camera body and reaching into said frontal shutter compartment in said camera body, said operating means cooperating with said shutter operating member, said view finder operating member and said film transporting member so as to be adapted to simultaneously slide said camera shutter, move said view finder and transport a film strip.

14. A photographic camera comprising a camera body, a frontal shutter compartment arranged in the front part of said camera body, a camera shutter arranged in said shutter compartment, an exposure chamber arranged in the rear part of said camera body behind said frontal shutter compartment, a view finder being movable between operative position arranged projecting from one face of said camera body and inoperative position arranged substantially flush with said face of said camera body, a spring means adapted to move said view finder from inoperative into operative position, blocking means adapted to hold said view finder against action of said spring means in inoperative position, a film transporting member reaching from said frontal shutter compartment beyond the rear end of said exposure chamber so as to be adapted to engage the perforations of a film strip if the same is arranged behind said exposure chamber, said film transporting member being movable in such a manner as to transport the film strip by engaging the perforations of the same and thus slide said film strip normal to the optical axis of said camera, a shutter operating member adapted to slide said camera shutter arranged in said frontal shutter compartment in direction of sliding of said film strip, a view finder operating member adapted to release said blocking means and thus enable said spring means to move said view finder from inoperative into operative position, and hand operated common shutter and view finder operating and film transporting means arranged outside of said camera body and reaching into the same, said hand operated common shutter and view finder operating and film transporting means cooperating with said shutter operating member, said view finder operating member and said film transporting member so as to be adapted to simultaneously slide said camera shutter, release said view finder for movement from inoperative into operative position, and to transport a film strip.

JACQUES BOLSEY.